Figure 5:
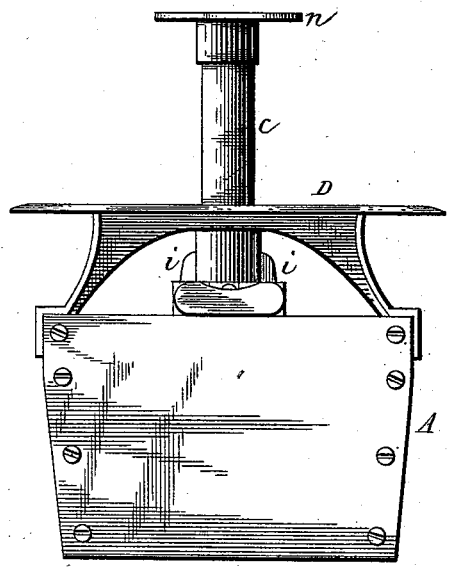

(No Model.) 2 Sheets—Sheet 1.
P. L. KIMBALL.
BUTTER MOLD.
No. 423,478. Patented Mar. 18, 1890.
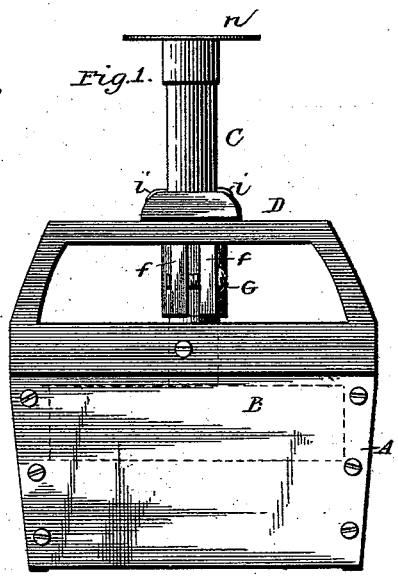
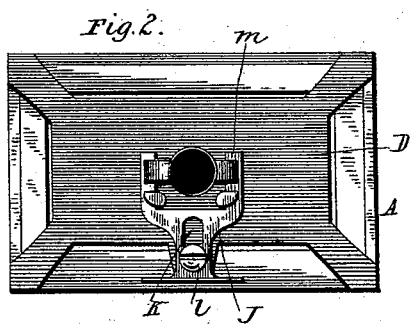
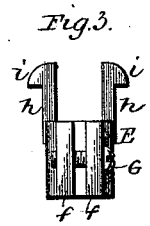 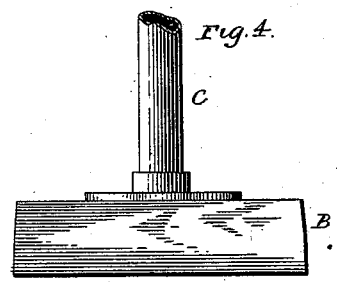
Witnesses
Will S. Norton
Harry S. Rohrer
Inventor
Perley L. Kimball
By his Attorneys
John J. Halsted & Son (No Model.) 2 Sheets—Sheet 2.

P. L. KIMBALL.
BUTTER MOLD.

No. 423,478. Patented Mar. 18, 1890.

Witnesses
Will T. Norton
Harry S. Rohrer

Inventor
Perley L. Kimball
By his Attorneys
John J. Halsted & Son

UNITED STATES PATENT OFFICE.

PERLEY L. KIMBALL, OF BELLOWS FALLS, VERMONT, ASSIGNOR TO THE VERMONT FARM MACHINE COMPANY, OF SAME PLACE.

BUTTER-MOLD.

SPECIFICATION forming part of Letters Patent No. 423,478, dated March 18, 1890.

Application filed August 19, 1889. Serial No. 321,296. (No model.)

*To all whom it may concern:*

Be it known that I, PERLEY L. KIMBALL, of Bellows Falls, in the county of Windham and State of Vermont, have invented certain new and useful Improvements in Butter-Printers; and I do hereby declare that the following is a full, clear, and exact description of the invention, which will enable others skilled in the art to which it appertains to make and use the same, reference being had to the accompanying drawings and to letters of reference marked thereon, which form a part of this specification.

The object of my present improvement is so to construct the apparatus that the plunger or stamp which is to print the butter may be set at any desired position in the mold, whereby it may print an exact quantity of the butter, and may also vary the size and weight at will so as to print pounds, half-pounds, or other fractions of a pound in the same mold and without the need of scales to determine the weight, the mold itself determining the weight. My improved mold and stamp thus serves practically as a weigher, being in fact what may be called a "self-gaging" or "self-weighing" butter-print, such that, when properly gaged or set, no weighing is necessary.

In the drawings, Figure 1 illustrates in elevation a mold and stamp embodying my invention; Fig. 2, a plan of the same with the knob or handle removed; Fig. 3, a detail of the clamp; Fig. 4, a detail of the plunger with its handle partially broken away; and Figs. 5 and 6, a mold and stamp embodying the same novel features as shown in Fig. 1, but with its top somewhat varied in form.

A is the mold or box of any suitable material, and which, by way of example, may be considered as having an interior capacity adapted for measuring and stamping one pound or less of butter.

B is the printing-plunger, connected to a stem C, which is arranged to be moved up and down through a bearing or guide-hole in the center of the supporting-frame D to a sufficient distance to enable the mold to measure and weigh a full pound, or to move a lesser distance to measure and weigh any amount less than a pound—as, for instance, a half pound—dependent upon the manner of adjustment, as will now be described, it being understood that the under face of the plunger may be carved with such design, name, monogram, or other device as may be preferred.

On the stem C is an open-ended clamp E, nearly surrounding it and having two ears $f$ $f$, one of which is screw-threaded and provided with a set-screw G, by means of which this clamp, because of its being springy or resilient, and therefore compressible, may be tightly clamped on the stem when the printing-plunger shall have been set at the proper place in the mold to print and measure the predetermined quantity and weight of butter. The tightening of this screw binds the clamping-collar close upon the stem, so that they move together as one. Projecting upward from this collar-clamp are extensions $h$ $h$, each having an outwardly-projecting ear $i$ to engage with and above a slide J, placed on the supporting-frame D. This slide, by means of a slot $k$ therein and a set-screw $l$, is adapted to be readily pushed in and out by a simple movement of, say, one's middle finger, so that its prongs $m$ shall pass under the ears $i$ $i$ when the plunger is raised to the highest point to which it has thus been adjusted, and thereby hold it in position preparatory to filling the mold with the desired weight and bulk of butter. Assuming that the mold has the capacity for a pound or less and that the clamp-collar has been set at its lowest point on the stem, so that the plunger B may be lifted to its highest point and there held by the slide, it will be evident that upon filling the mold at its open bottom, pulling back the detaining-slide, and then pushing down the plunger, a pound of printed butter will be expelled from the mold.

By putting any visible mark on the stem at the proper place for indicating a half pound or any other fraction of a pound, and then setting and securing the clamp-collar accordingly higher upon the stem, it will be evident that the same operations as before mentioned will weigh, measure, print, mold, and discharge a smaller print of butter.

The stem C is at its lower end soldered into a socket on the upper side of the plunger B, and the cap n on the stem is screwed upon the threaded upper end of the stem.

The frame D (shown in Fig. 1) is secured, as will be seen, all around the top of box A.

Figure 6:
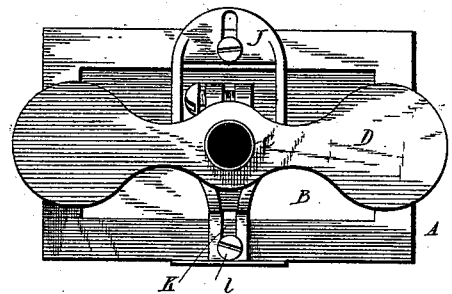

In the form shown in Figs. 5 and 6, the frame D is fastened to the mold-box at its opposite ends only, the slide instead of being on top of the frame works on a set-screw l on the box, and the ears i i are made directly on the collar. The essential or leading features, however, as also the adjustments, operations, and results attained are the same as already described above.

The process of printing and molding by my improved device is very rapid, and with but little practice a person can easily mold from ten to fifteen prints per minute.

The whole apparatus may be made of any desired material; but the mold is preferably made of close-grained hard wood and with nickel-plated top plate and trimmings.

For printing pounds or less the inside of the mold may be four and five-eighths by two and one-half by two and three-eighth inches, and correspondingly larger or deeper for larger prints of butter.

I claim—

1. A butter-mold consisting of a presser-carrying plunger, a clamp secured to the plunger-stem and provided with lateral ears or projections, a frame through which the stem plays, and a suitably-mounted slide engaging the ears to hold the plunger in position.

2. In combination with the mold-box and its top frame, the plunger having an adjustable clamp E, provided with ears or projections i i, and a slide adapted to engage with such projections, as and for the purposes set forth.

PERLEY L. KIMBALL.

Witnesses:
W. C. STUROC,
FREDERIC H. DROWNE.